250/201

United States Patent [19]

Kramer et al.

[11] 3,876,841

[45] Apr. 8, 1975

[54] APPARATUS FOR READING A FLAT REFLECTING RECORD CARRIER WITH AUTOFOCUSING MEANS

[75] Inventors: Pieter Kramer; Gijsbertus Bouwhuis; Paul Edwin Day, all of Emmasingel, Eindhoven, Netherlands

[73] Assignee: U.S. Philips Corporation, New York, N.Y.

[22] Filed: May 10, 1973

[21] Appl. No.: 358,994

[30] Foreign Application Priority Data

May 11, 1972 Netherlands ........................ 7206377
Apr. 19, 1973 Netherlands ........................ 7305517

[52] U.S. Cl. ......... 179/100.3 V; 178/6.7 A; 250/201
[51] Int. Cl. ............................................ G11b 7/12
[58] Field of Search ................ 250/201, 211 R, 578; 178/DIG. 29, 6.7 A, 6.7 R; 179/100.3 V

[56] References Cited

UNITED STATES PATENTS

| | | | |
|---|---|---|---|
| 3,198,880 | 8/1965 | Tovlon | 179/100.3 V |
| 3,502,415 | 3/1970 | Hock | 356/167 |
| 3,635,551 | 1/1972 | Szymber | 250/204 |
| 3,639,048 | 2/1972 | Heaney | 353/101 |
| 3,689,772 | 9/1972 | George | 250/211 J |
| 3,721,827 | 3/1973 | Reinheimer | 250/201 |

FOREIGN PATENTS OR APPLICATIONS

| | | | |
|---|---|---|---|
| 1,103,050 | 3/1961 | Germany | 250/201 |

*Primary Examiner*—Bernard Konick
*Assistant Examiner*—Alan Faber
*Attorney, Agent, or Firm*—Frank R. Trifari; Simon L. Cohen

[57] ABSTRACT

An apparatus for reading a flat reflecting record carrier on which information has been recorded in at least one track having an optical structure is described which comprises a source of radiation and a radiation-sensitive signal detection system for converting a read beam emitted by the source and modulated by the information into electric signals. By inserting one and the same image-forming element in the path of the radiation from the radiation source to the position of the record carrier and in the path of the radiation from this position to the signal detection system there may be produced in additional radiation-sensitive detectors signals which provide an indication of the deviation of the actual position of the plane of a track part to be read from the desired position of this plane, without the information recorded in the record carrier being used.

6 Claims, 13 Drawing Figures

Figure 1:
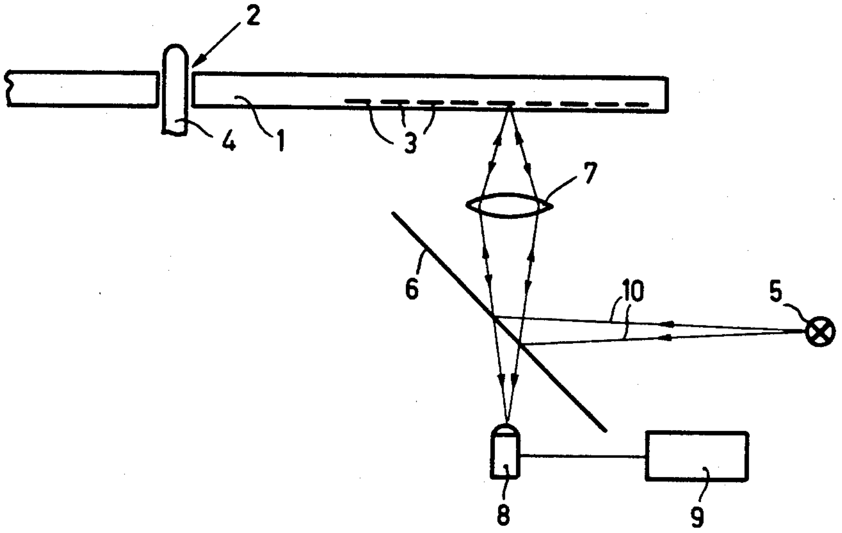

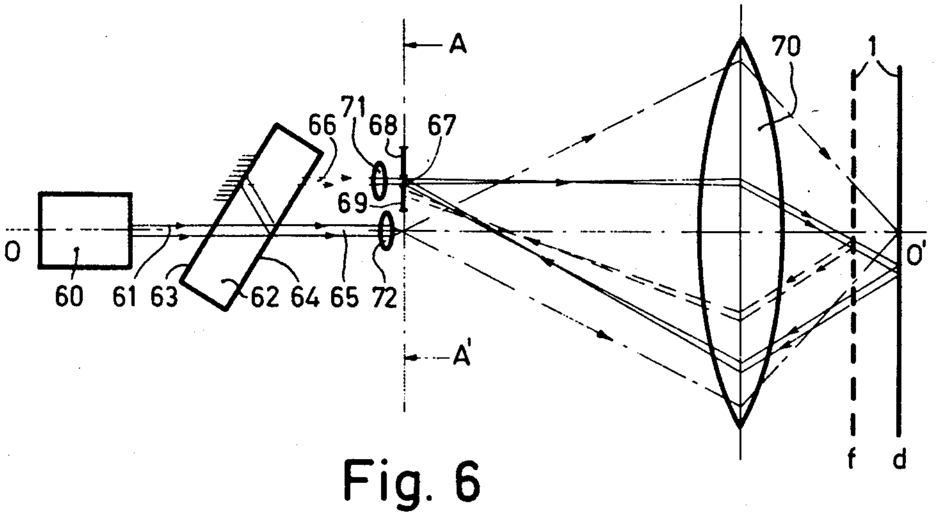
Fig. 6
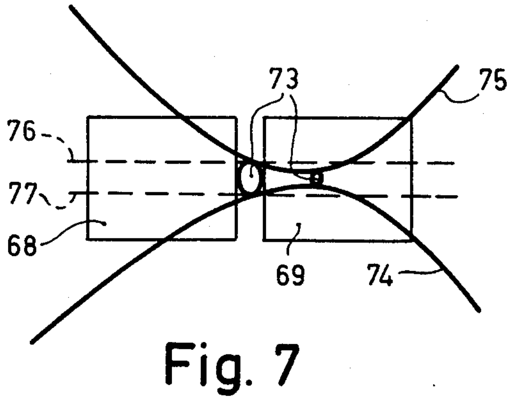
Fig. 7
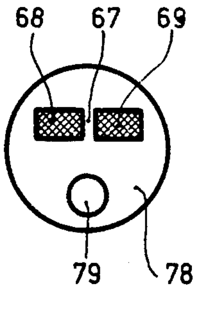
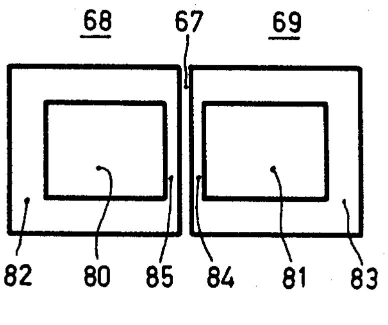
Fig. 8
Fig. 9

APPARATUS FOR READING A FLAT REFLECTING RECORD CARRIER WITH AUTOFOCUSING MEANS

The invention relates to an apparatus for reading a flat reflecting record carrier on which information, for example video and/or audio information, is recorded in at least one track having an optical structure, which apparatus comprises a source of radiation and a radiation-sensitive signal detection system for converting a read beam which is emitted by the source and is modulated by the information into electric signals.

The term "a flat record carrier" is to be understood to mean any record carrier the optical structure of which lies in a flat surface at the location at which this structure is read. The term "a reflecting record carrier" is to be understood to mean a record carrier in which the information is recorded in a reflecting structure. Such a structure may take the form of co-planar radiation-reflecting blocks and intermediate areas which have a reflection coefficient different from that of the blocks or of radiation-reflecting blocks and areas situated at different levels. Apparatuses for reading flat record carriers are described inter alia in British Patent Specification No. 1,146,843. For reading a circular record carrier the record carrier is rotated so that the signal detection system successively picks up radiation from different parts of a track of the record carrier. All the tracks can be consecutively read by relative radial movement of the record carrier and the signal detection system.

In the known read apparatus the distances from the source of radiation to the record carrier and from the record carrier to the signal detection system are such that only a small part of a track, of a size of about the smallest detail in the optical structure of the information, is imaged on the signal detection system. The radiation path from the source of the radiation to the plane of a track part to be read and the radiation path from this plane to the signal detection system may be subject to small variations. These variations may have different causes. First the surface of the carrier may not be perfectly flat. Secondly, when the record carrier is a foil rotation thereof may give rise to undulations. Furthermore the optical element of the read system may be subject to vibrations.

When these variations occur, the signal detection system receives not only radiation from the part of a track to be read, but also radiation from the surroundings of this part. As a result, the depth of modulation of the signal produced by the signal detection system is decreased. In addition, since radiation from several adjacent tracks impinges on the signal detection system, cross-talk occurs. The reduced modulation depth and the cross-talk then prevent satisfactory signal detection.

It is an object of the present invention to provide a read apparatus, in particular for use with a reflecting record carrier, in which differences between the desired position of the plane of the track part to be read, i.e. the position in which the desired part only of the record carrier is imaged on the signal detection system, and the actual position of this plane are detected, enabling an optical element inserted in the path of the radiation from the radiation source to the radiation detection system to be correspondingly adapted. For this purpose the apparatus according to the invention is characterized in that one and the same image-forming element is inserted in the path of the radiation from the radiation source to the location of the record carrier and in the path of the radiation from this location to the signal detection system, and in that further at least two radiation-sensitive detectors are provided in which, without the information stored in the record carrier being used, auxiliary signals are produced by at least one auxiliary beam of radiation which is reflected at the record carrier, which auxiliary signals show a difference which is a measure of the deviation of the actual position of the plane of a track part to be read from the desired position of this plane.

It should be noted that in co-pending U.S. Pat. Applications Ser. No. 229,291, filed Feb. 15, 1972 now U.S. Pat. No. 3,833,769 and Ser. No. 340,977, filed Mar. 14, 1973 it is proposed to use two detectors for detecting the position of the plane of a track part to be read. However, in these proposed apparatuses either the information of a large number of tracks in the vicinity of the track to be read U.S. Pat. No. 3,833,769 or the information of the track to be read (U.S. Ser. No. 340,977, filed Mar. 14, 1973) is used, so that in contradistinction to the apparatus according to the present invention not the reflective property alone of the record carrier is used.

A first embodiment of an apparatus according to the invention is characterized in that in the path of an auxiliary beam of radiation reflected at the record carrier to two detectors a radiation-absorbing screen is inserted at a location which is optically related to the desired position of the plane of a track part to be read. The screen is capable of influencing the radiation directed to the two detectors. If this plane occupies the desired position, the detectors arranged behind the screen receive equal radiation intensities. In the case of a deviation from the desired position, one of the detectors receives a greater amount of radiation than the other.

In another embodiment a plurality of detectors are aligned in a plane so as to be separated from one another by slits. The plane is inclined at an acute angle to the plane of a track part to be read. An image of the aligned detectors is formed, and the line of intersection of this image with the record carrier determines which location of the record carrier is sharply imaged on one of the detectors.

In this embodiment a plurality of component sources of radiation may be disposed in the slits between the detectors.

In a further embodiment at least one auxiliary source of radiation is provided which emits a beam of radiation the principal ray of which is inclined at an acute angle to the plane of the track part to be read. Owing to the inclined incidence of the principal ray on the plane of the track part to be read a small displacement of this plane will result in a large change in the location at which the principal ray impinges on this plane.

According to a further embodiment there is provided an auxiliary radiation source which supplies an auxiliary beam of radiation which has a diameter which, compared with the aperture of the image-forming element, is small, the auxiliary beam entering the aperture of said element outside the central part.

Figure 2:
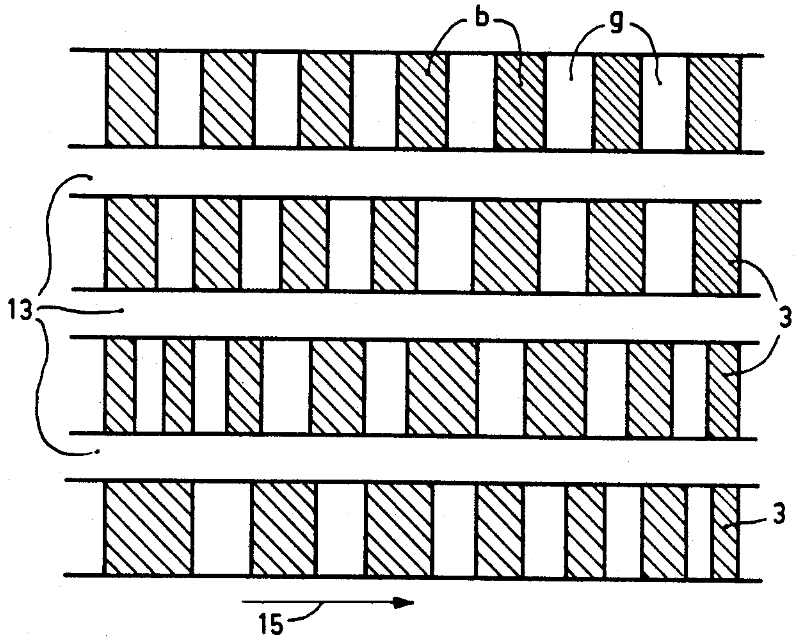
Figure 3:
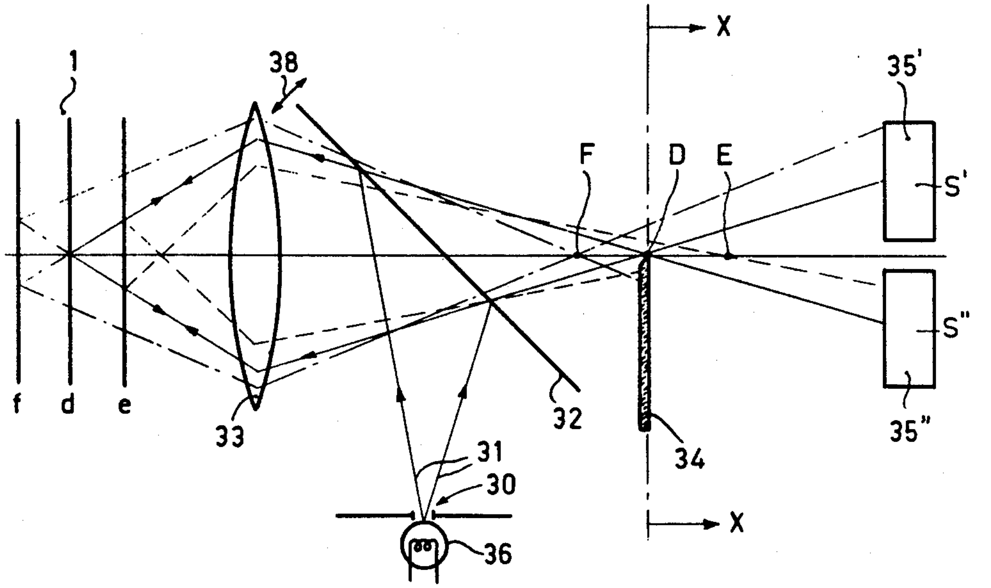

Embodiments of the invention will now be described, by way of example, with reference to the accompanying diagrammatic drawings, in which:

FIG. 1 shows a previously proposed apparatus for reading a reflecting record carrier, FIG. 2 shows part of the optical structure of the record carrier to be read, and FIGS. 3, 4, 5 and 6 show four embodiments of an apparatus according to the invention, FIGS. 3*a*, 8, 9 and 12 show elements for use in the apparatus shown in FIGS. 3 and 6 respectively, and FIGS. 7, 10, 11, and 12 illustrate the operation of the apparatus shown in FIG. 6.

Referring now to FIG. 1, in the apparatus shown a circular record carrier 1 is rotated by means of a spindle 4 which is driven by a motor, not shown, and passes through a center hole 2 in the information carrier. A beam of radiation 10 emitted by a source of radiation 5 is reflected to the record carrier by a half-silvered mirror 6. A lens 7 focuses the beam on one of the tracks 3 formed on the lower surface of the record carrier. After being modulated by a track the beam is reflected and passes through the lens 7 a second time, so that an image of a small part of the track to be read is formed via the half-silvered mirror 7 on a radiation-sensitive detector 8. The output of the detector is connected to a device 9 provided with known electronic means for converting the output signal from the detector into picture and sound. The lens 7 has to satisfy exacting requirements, because it should form an image of only a part of the track about equal in size to the smallest detail in the optical structure of the information.

FIG. 2 is a bottom plan view of part of the optical structure of the record carrier. An arrow 15 indicates the direction in which the record carrier is moved relative to the read system. The structure is composed of tracks 3 which each comprise blocks *b* alternating with areas *g*. The tracks 3 are separated by neutral intermediate stripes 13. The tracks 3 may be arranged on the record carrier so as to be parallel to one another, i.e. concentric. As an alternative a single spiral track may be formed on the record carrier. The lengths of the blocks and areas represent the stored information. A radiation beam which has been modulated by the track shows pulsatory variations in time in accordance with the sequence of blocks and areas. The blocks and areas of a track may be co-planar, in which case the coefficient of reflection of a block may be different from that of an area. Alternatively, the blocks and areas may have equal coefficients of reflection but be situated on different levels.

In an embodiment of an optical structure the mean period in the direction of length of a track is 4 $\mu$m and the minimum length in a track is 2 $\mu$m, so that the image formed on the detector must be smaller than 2 $\mu$m. This requires the plane of the optical structure to lie within the depth of focus of, for example, 1 $\mu$m of the lens 7. Therefore any shift of this plane in a direction at right angles to the plane must be detected so as to permit corrective adjustment.

A first embodiment of an apparatus according to the invention which includes means for detecting whether the plane of the track is in its desired position is shown in FIG. 3.

A slit 30 is illuminated by a source of radiation 36. Rays 31 which pass through the slit impinge on a half-silvered mirror 32 and are reflected by it to an objective lens 33. The lens 33 forms an image of the slit on a record carrier 1. After reflection at the record carrier the rays traverse the lens a second time and pass through the half-silvered mirror 32, thus forming a second image of the slit. A radiation-absorbing screen 34 is inserted in the path of the rays reflected by the record carrier, two radiation-sensitive detectors 35′ and 35″ being arranged behind the screen.

When the plane of the track part to be read is in the correct position (position *d*) a sharp image D of the slit is formed at the edge of the screen, as is shown by solid lines. In this case the two detectors 35′ and 35″ receive equal amounts of radiation. When the plane of the track part being read shifts to a position *f* the rays follow the path shown by dot dash lines, an image F being formed in front of the screen. The screen then intercepts rays which travel to the detector 35″, so that this detector receives a smaller amount of radiation than does the detector 35′. The converse will occur when an image E is formed behind the screen. This is the case, as is indicated by broken lines, when the plane of the track part being read is in a position *e*.

A comparison of the output signals S′ and S″ from the detectors 35′ and 35″ respectively enables the amount by which, and the direction in which, the plane of the track part being read differs from the desired position to be determined. The signals S′ and S″ may be electronically processed in known manner to give a control signal by which, for example, the focussing of the lens 33 may be adjusted.

The detectors may alternatively be used for reading the information of the record carrier, if care is taken to ensure that, if the plane of the track part to be read is in the position *d*, a part of the track equal in size to the smallest optical detail is imaged on their detectors.

For the sake of clarity, in FIG. 3 the distances *d–e* and *d–f* are shown greatly exaggerated in comparison to the lens diameter.

Figure 3A:
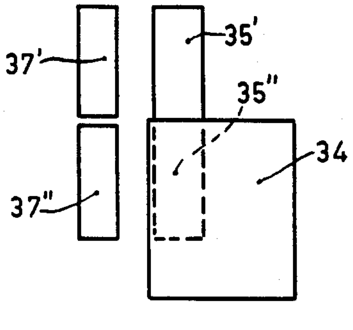

In the apparatus shown in FIG. 3 inaccuracies in the read system, for example a shift of the slit 30 or of any of the other optical elements, may cause the output signals from the detectors 35′ and 35″ to be different in spite of the fact that an image of the slit 30 is formed at the edge of the screen 34, in other words the plane of the track part to be read is in the desired position. To prevent such inaccuracies, according to the invention two additional radiation-sensitive detectors may be provided and the half-silvered mirror 32 may be pivotable. In this case the detectors 35′ and 35″ and the radiation-absorbing screen are located in the space on one side of the plane of the drawing, while the additional detectors 37′ and 37″ are located in the space on the other side of this plane. This is illustrated in FIG. 3*a* which is a sectional view, taken along a line XX, of the apparatus according to FIG. 3 when provided with additional detectors 37′ and 37″. A shift of the radiation beam over the detectors 37′ and 37″ due to instabilities in the optical system causes different low-frequency signals to be produced at the outputs of these detectors. These signals may be electronically processed to give a control signal by means of which the half-silvered mirror 32 is pivoted in the direction indicated by an arrow 38, until the detectors 37′ and 37″ supply equal output signals. Thus the points in which the radiation beam strikes the detectors 35′ and 35″ may be rendered independent of instabilities in the optical system.

Figure 4:
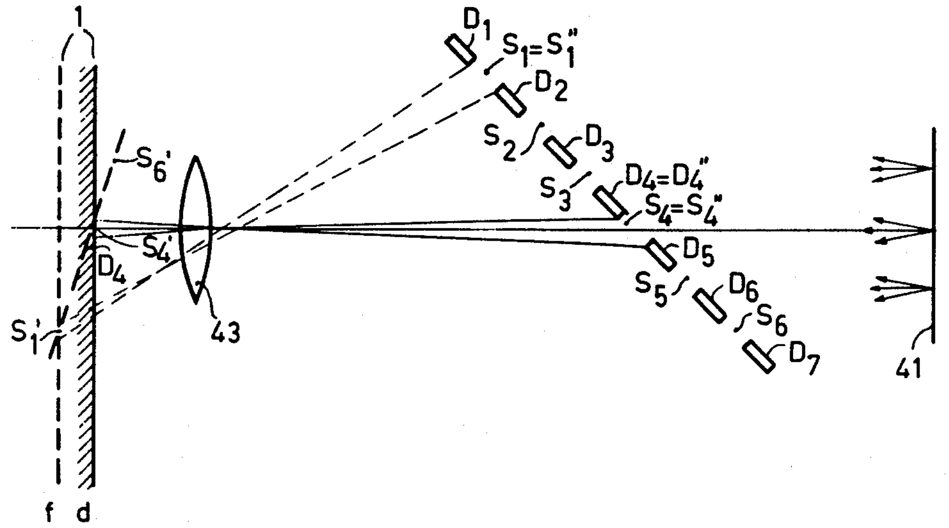

FIG. 4 shows a second embodiment of an apparatus according to the invention. A plurality of radiation-sensitive detectors $D_1$ to $D_7$ are aligned. The detectors are separated from one another by slits $S_1$ to $S_6$ which are illuminated by a source of radiation 41. A lens 43 forms an image $S_1'$ to $S_6'$ of the row of slits which is inclined at an acute angle to the plane of the track, which image also is inclined thereto. Via the reflecting record carrier a second image $S_1''$ to $S_6''$ of the image $S_1'$ to $S_6'$ is formed on the original row of slits $S_1$ to $S_6$. Because the row of slits is inclined to the plane of the track, only a small part of this row, namely the part surrounding a point the image of which lies in the plane of the track, is sharply imaged on itself. When the plane of the track is in the position *d*, the slit $S_4$ is sharply imaged on itself ($S_4=S_4''$). A sharp image of a slit formed on the slit means that the detectors situated on either side of the slit do not receive radiation emanating from this slit. Thus, in the position *d* of the plane of the track detectors $D_4$ and $D_5$ receive no radiation emanating from the slit $S_4$. In the position *f* of the plane of the track the slit $S_1$ is sharply imaged on itself ($S_1=S_1''$) and detectors $D_1$ and $D_2$ receive no radiation emanating from the slit $S_1$. By determining the values of the output signals from the detectors the magnitude and the direction of a deviation of the actual position of the plane of the track from the desired position can be detected.

The source of radiation 41 arranged behind the row of slits may be replaced by a row of radiation sources, for example semiconductor radiation sources such as photo-emissive diodes, which radiation sources then are disposed in the slits between the detectors.

In the third embodiment of an apparatus according to the invention the fact is utilized that the location at which a beam of radiation the principal ray of which is incident on the plane of the track to be read at a sharp angle impinges on this plane depends upon the position of this plane. In this case, the location also on the detection system at which the beam reflected by the record carrier impinges on this detection system is dependent upon the position of the said plane.

Figure 5:
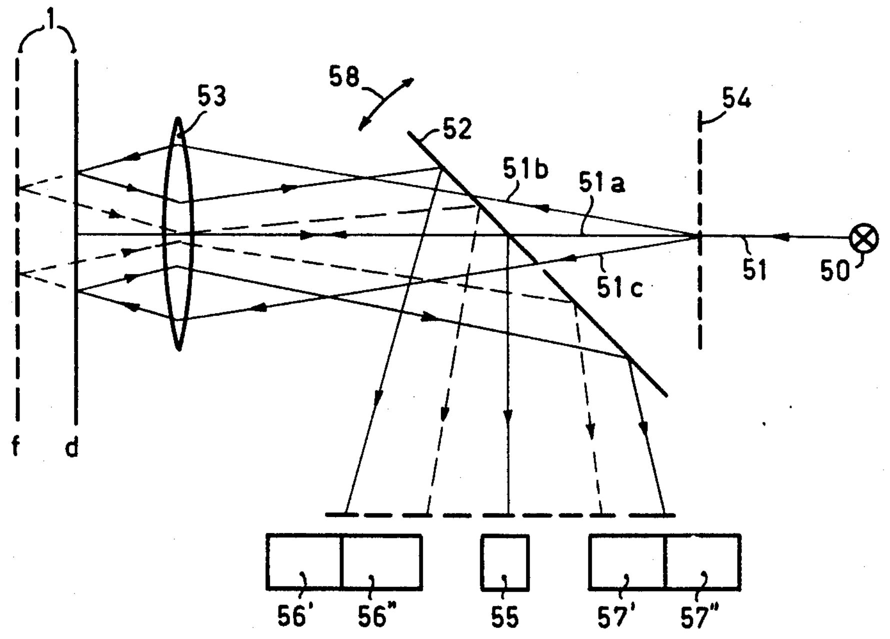

In the example of such an embodiment shown in FIG. 5 a beam of radiation 51 emitted by a source 50 is incident on a grating 54. This grating may be a phase grating which is blazed so that the intensities of the beams of orders higher than the first are suppressed. The grating 54 causes three diffraction images of the source 50 to be formed by beams 51*a*, 51*b* and 51*c*. For clarity only one ray of each of these beams is shown.

The Figure clearly shows that when the plane of the track is in the position *d* the beams 51*a*, 51*b* and 51*c* shown by solid lines impinge at other locations on the said plane and hence on detectors 55, 56 and 57 than when the plane of the track occupies the position *f*, because for the positions *d* and *f* the beams after being reflected pass through the lens at different heights and hence are refracted through different angles. The information from the record carrier can be read by means of the detector 55. The auxiliary detector 56 comprises two component detectors 56' and 56'' the output signals from which are equal only if the record carrier occupies the desired position (*d*). A comparison of the output signals from the detectors 56' and 56'' permits of determining whether the actual position of the plane of the track to be read differs from the desired position of this plane and in which direction a deviation, if found, occurs.

To obtain maximum sensitivity in determining the position of the plane of the track to be read it is ensured that the first-order beams pass through the edge of the lens 53. For this purpose the grating is spaced from the lens by a distance equal to a few times the focal distance of the lens.

A shift of the plane of the track to be read through a distance of S $\mu$m causes a change $\Delta p$ of the position *p* in which a beam having an obliquely incident principal ray impinges on the plane, where $\Delta p \sim S.(N.A.)$, where N.A. represents the numerical aperture. Because the record carrier is used as a mirror and because the lens forms an image which is magnified by a factor *v*, a shift through $\Delta p$ means a displacement of the image over the detectors 56' and 56'' of $\Delta p' = 2\ v^2 S.(N.A.)$. When using a lens having a N.A. of 0.4 and a magnification *v* of 20 a shift of the plane of the track through 0.5 $\mu$m will cause a displacement of the image over the detectors of about 160 $\mu$m. It is assumed that the source of radiation, for example a laser, is stable in respect of position and direction. In practice this means that, for example, the two ends of the laser source must be mounted so as to be stable within 0.15 mm relative to the optical elements. Otherwise a small displacement of the radiation source may cause an error signal to be derived from the output signals of the detectors 56' and 56'' in spite of the fact that the plane of the track occupies the required position.

To enable a sufficient degree of accuracy to be obtained without the stability of the radiation source being required to satisfy stringent requirements, according to the invention an additional provision may be made in the form of a half-silvered mirror 52 and an additional detector 57 which is divided in two component detectors 57' and 57''. Displacements of the radiation beams over the component detectors 57' and 57'' due to instabilities of the radiation source cause low-frequency signals to be produced at the outputs of these detectors. These signals may electronically be processed to give a control signal by means of which the half-silvered mirror 52 may be pivoted in the direction indicated by an arrow 58. In this manner the locations at which the radiation beams 51*a* and 51*b* impinge on the detectors 55 and 56 may be rendered independent of instabilities of the source of light.

FIG. 6 shows a fourth embodiment of an apparatus according to the invention. A laser source 60 emits a small-diameter beam of radiation 61. This radiation beam enters a beam splitter 62 through a surface 63 thereof. A surface 64 of the beam splitter is semitransparent, so that part of the radiation beam 61 is transmitted as a radiation beam 65 and another part is reflected to the surface 63. This part is totally reflected at the surface 63 and then leaves the beam splitter as a second radiation beam 66. The radiation beam 66 acts as an auxiliary radiation beam and passes through a slit-shaped aperture 67. The aperture 67 is bounded by two radiation-sensitive detectors 68 and 69. An objective lens 70 the optical axis of which is indicated by 00' is arranged behind the slit-shaped aperture. The auxiliary radiation beam 66 enters the lens 70 at a location spaced by a comparatively large distance from the optical axis 00'. After refraction by the lens 70 the auxiliary radiation beam 66 impinges on a record carrier 1. The record carrier acts as a mirror for the auxiliary radiation beam.

If the record carrier 1 is in the correct position (position *d*), an image of the aperture 67 is formed in the plane of this aperture so as to be symmetrical with respect to the aperture. In this case the radiation-sensitive detectors 68 and 69 situated one on either side of the aperture receive about equal radiation intensities, so that the difference between the electric signals supplied by these detectors is negligible.

When the record carrier shifts to a position *f*, the reflected auxiliary ray beam travels along a path indicated by broken lines. The reflected auxiliary radiation beam passes though the lens 70 at another level than in the case *d*, so that it is refracted through a smaller angle. As a result, the image of the aperture 67 will shift towards a detector 69, so that the larger part of the reflected auxiliary radiation beam strikes this detector. Thus, the electric signal supplied by the detector 69 considerably exceeds the output signal from the detector 68. When the record carrier 1 is shifted to the right-hand side in the drawing, the image of the aperture 67 will shift in the direction towards the radiation-sensitive detector 68. In this case the output signal from the detector 68 considerably exceeds that from the detector 69.

A comparison of the output signals from the detectors 68 and 69 permits of ascertaining whether the plane of the track part to be read is in the desired position and of determining the direction of a deviation. The output signals from the detectors may electronically be processed in known manner to provide a control signal which, for example, enables the focussing of a lens, such as the lens 70, by means of which an image of a small part of a track is formed on the signal detection system, not shown, to be adjusted.

The slit-shaped aperture 67 which provides the small-diameter auxiliary radiation beam may be separated from the elements 68 and 69 which intercept the reflected auxiliary radiation beam. However, the arrangement shown in FIG. 6 is to be preferred, because the position of the slit-shaped aperture 67 is defined by the positions of the elements 68 and 69, so that no positional deviations between these elements and the source of radiation can occur, as is the case in the embodiments shown in FIGS. 3 and 5. Consequently no additional provisions, for example in the form of additional radiation-sensitive detectors and a pivotable mirror, for compensating for the said deviations need be made.

In the embodiment of FIG. 6 as described so far the source of radiation which supplies the auxiliary radiation beam is imaged in the vicinity of the record carrier by the objective lens 70. Depending upon the position of this record carrier the size of this image will vary and so will the size of the spot which after reflection at the record carrier is formed on the radiation-sensitive detectors 68 and 69. The radiation source which supplies the auxiliary radiation beam does not lie in the plane of the slit-shaped aperture and the radiation-sensitive detectors. As is shown in FIG. 7, this would cause the size of the spot 73 to vary asymmetrically as a function of the location. Lines 74 and 75 show the boundaries of this spot on the detectors 68 and 69. Evidently the variation of the size of the spot 73 may give rise to an erroneous indication.

According to the invention an auxiliary lens 71 is inserted in the path of the auxiliary radiation beam 66 between the beam splitter and the slit-shaped aperture 67. This auxiliary lens forms an image of the radiation source in the focal plane of the objective lens 70, so that the auxiliary radiation beam emerges from the objective lens as a parallel beam. Thus an image of constant size is formed on the record carrier so that the spot on the detectors 68 and 69 also will have a constant size, as is indicated by broken lines 76 and 77 in FIG. 7. As a result, the influence of the radiation source on the measurement is substantially eliminated.

Instead of two radiation-sensitive detectors 68 and 69 two reflecting elements may be arranged one on either side of the slit-shaped aperture 67. These elements then reflect the radiation along two different paths. A radiation-sensitive detector must be inserted in either path. However, the embodiment shown in FIG. 6, in which the aperture is bounded by two radiation-sensitive detectors, is to be preferred, because no additional optical elements are required for concentrating the radiation from the reflecting elements onto the detectors and furthermore no difficult aligning problems arise.

In the apparatus shown in FIG. 6 the radiation beam 65 split from the beam 61 by the beam splitter 63 passes through a lens 72 and acts as the read-out beam. Only two rays of this beam are shown by dot dash lines. The read-out beam 65 is focussed onto a track of the record carrier 1 by the lens 70. The beam which is reflected from the record carrier and is modulated in accordance with the information in a track passes again through the lens 70 and then may, for example, be reflected to the signal detection system, not shown, by a half-silvered mirror, not shown.

The apparatus shown in FIG. 6 may be combined with means for determining the position of the read-out beam relative to the track to be read. Thus, for example, the read beam may be divided into three sub-beams by a grating which is arranged in front of the plane of the slit 67 and the lines of which lie in a plane perpendicular to the optical axis 00'. This causes three spots of radiation to be formed on the track to be read, one of the centre of the track and one on each track edge. The middle spot is used for reading the information and the two outer spots are used for positioning the read beam with respect to the track.

FIG. 8 is a sectional view taken on the line A A' of FIG. 6. An opaque plate 78 has an opening 79 formed in it through which the said three sub-beams can pass. Two radiation-sensitive detectors 68 and 69 are arranged on the plate 78 so as to define a narrow transparent slit-shaped aperture 67.

The width of the slit-shaped aperture is determined inter alia by the signal-to-noise ratio of the detection system. In practice, the radiation source 60 will frequently be a source of laser radiation having a Gaussian distribution of intensity. When using a comparatively narrow aperture 67 the radiation emerging from the aperture will have a comparatively constant intensity. In this case, however, the overall intensity is small and hence the electric signals from the detectors are small also. When a wider aperture 67 is used, the overall intensity of the radiation beam which emerges from the slit-shaped aperture is greater. In this case, however, the radiation beam and hence the radiation reflected to the detectors 68 and 69 will show a spatially inhomogeneous intensity distribution.

Figure 10:
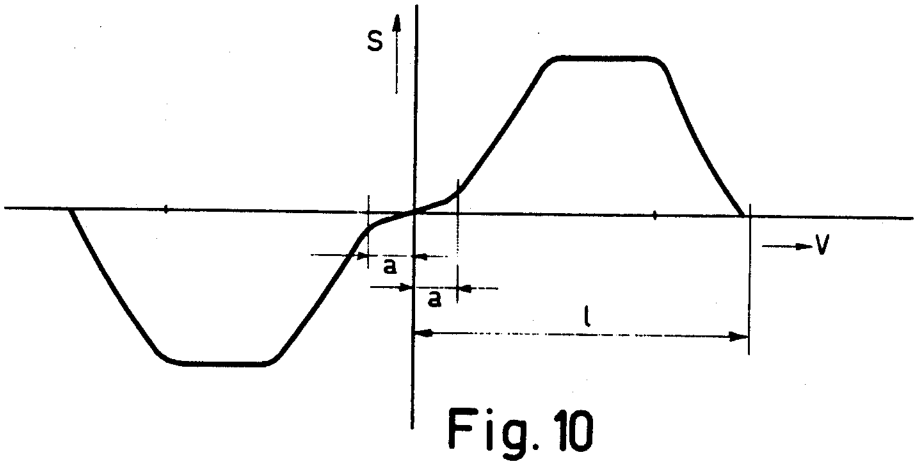

The radiation-sensitive detectors may be photodiodes. As is shown in FIG. 9, such a photodiode comprises an inner portion (80 and 81 respectively) which is made of a photo-sensitive semiconductor material and is surrounded by "blind" margins (82 and 83 respectively) which are insensitive to the radiation. With conventional diodes the width of the blind margin will be of the order of 100 $\mu$m hence roughly equal to the width of the aperture 67. When such wide-margin photodiodes are used, the curve which in FIG. 10 shows the electric difference signal (S) as a function of the displacement (V) of the track part to be read will have a substantially horizontal portion in a comparatively large region ($2a$) around the zero crossing. In this region the focussing of the objective 70 cannot sufficiently be adjusted.

Figure 11:
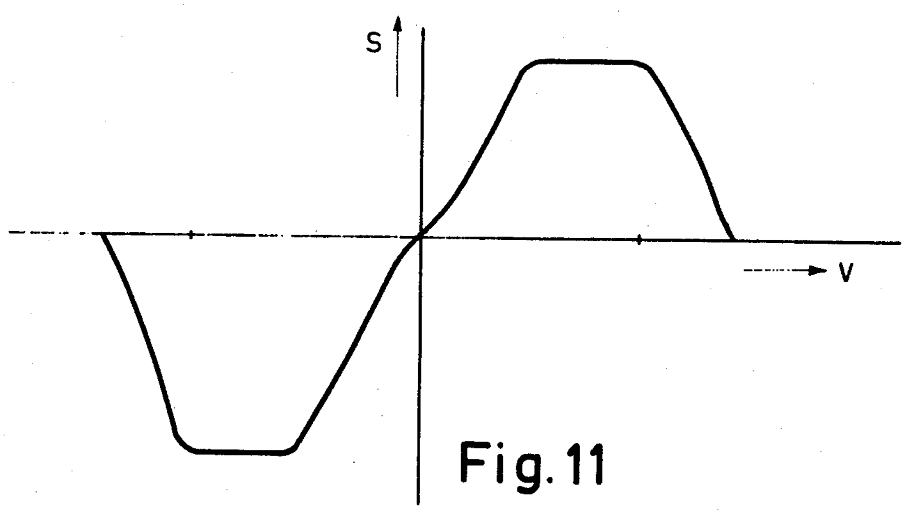

FIG. 11 shows the improved curve of the electrical difference signal as a function of the displacement according to the invention. In the vicinity of the zero crossing the curve has a slope which is substantially equal to that at locations more remote from the zero crossing.

According to the invention, in order to attain the said improved situation care is taken in the manufacture of the photodiodes to ensure that those margins of the photodiodes which are adjacent to the slit-shaped aperture are as narrow as possible. The photodiodes are simultaneously manufactured in large numbers on a chip of semiconductor material and then cut from the chip. The cutting process may give rise to mechanical stresses in the material which in turn may give rise large leakage currents when the photo diodes are used in the apparatus shown in FIG. 6. If, however, the margins 84 and 85 (FIG. 9) which define the slit-shaped aperture 67 are made narrow and the remaining margins 82 and 83 are made much wider, the likelihood of leakage currents can be reduced whilst the photodiodes are highly suitable for use in the apparatus described.

The sensitivity of the apparatus according to the invention, i.e. the smallest detectable deviation of the actual position of the plane of the track part to be read from its desired position, is given by:

$$G = k_1.r \tag{1}$$

where $k_1$ is a constant and $r$ is the distance of the optical axis from the point at which the auxillary beam impinges on the lens 70. The lock-in range, i.e. the maximum detectable deviation, is given by $$l = k_2.\frac{l}{r} \tag{2}$$

where $r$ is the same parameter as in equation (1), $k_2$ is a constant and $l$ is the length of the diodes (cf. FIG. 10). According to the equations (1) and (2) $r$ has to satisfy conflicting requirements. Hence the value of $r$ will in practice be a compromise.

Figure 12:
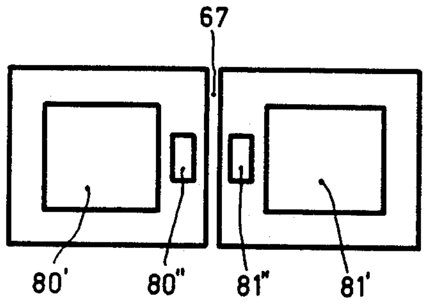

In addition to the auxiliary radiation beam reflected from the record carrier, stray radiation, for example radiation reflected from the objective 70, may strike the photodiodes. According to the invention the influence of the stray radiation may considerably be reduced in that, as is shown in FIG. 12, each detector is divided into two separate component detectors 80′, 80″ and 81′, 81″ respectively. The lengths of the component detectors 80″ and 81″ are much smaller than those of the component detectors 80′ and 81′. It is ensured that at the same intensity of the incident radiation the electric output signals from the component detectors 80″ and 81″ greatly exceed those from the component detectors 80′ and 81′. This is obtainable either by making the component detectors 80″ and 81″ more sensitive than the component detectors 80′ and 81′ or by amplifying the signals from the component detectors 80″ and 81″ by a higher factor (for example a factor of 10) than the signals from the component detectors 80′ and 81′.

When the deviation of the actual position of the plane of the track part to be read from the desired position is small, the influence of the stray radiation incident on almost the entire surface area of the detectors 80′ and 81′ will be negligible. In this case, the component detectors 80″ and 81″ substantially alone contribute to the control signal.

The influence of the stray radiation may be further reduced by making the widths also of the component detectors 80″ and 81″ smaller than those of the component detectors 80′ and 81′ (see FIG. 12).

The detector arrangement shown in FIG. 12 not only causes the influence of stray radiation to be reduced but also improves the control slope. In the vicinity of the origin the slope of the difference signal versus the position of the plane of the track part to be read is much steeper than in FIG. 11.

In a practical embodiment of an apparatus as shown in FIG. 6 the width of the margins 84 and 85 was 10 $\mu$m and that of the remaining margins of the photodiodes was 200 $\mu$m. The width of the slit-shaped aperture was 250 $\mu$m. The radiation source 60 emitted a laser beam having a Gaussian distribution of intensity the half-value width of which was 700 $\mu$m. The smallest detectable deviation of the actual position of the plane of the track part to be read from the desired position was 1 $\mu$m with a lock-in range of 1 mm.

Hereinbefore an apparatus according to the invention for reading a disk-shaped record carrier has been described. Obviously the invention may also be applied to reading other record carriers, for example tape-shaped record carriers in which the structure which represents the information lies in a flat surface at the location at which it is read, whilst a small part of this structure is to be imaged on a radiation-sensitive detector.

What is claimed is:

1. Apparatus for reading a flat reflecting record carrier on which information is recorded in the form of an optically readable track structure, comprising a radiation source emitting a read beam of radiation, beam splitting means for dividing said read beam into a read sub-beam and an auxiliary sub-beam spaced from said read sub-beam and propagating in substantially the same direction therewith, an objective system means for focussing said read sub-beam on the track structure of said record carrier, radiation sensitive signal detection means for converting the read sub-beam as modulated by the information in the track structure into an electrical signal, an opaque member in the path of the auxiliary sub-beam between said beam splitting means and said objective system means, said opaque member being provided with an aperture arranged outside the optical axis of said objective system means, the aperture limited portion of the auxiliary sub-beam passing through said aperture thereby passing excentrically through said objective system means to said record carrier and reflecting off the surface of said record carrier to pass again through said objective system and to be converged thereby at a point in space, said point being at a predetermined location in response to a desired distance between the record carrier and the objective system, and a pair of radiation-sensitive elements symmetrically arranged about said predetermined location and secured to said opaque member.

2. Apparatus as claimed in claim 1, wherein the aperture in said opaque member is slit-shaped, and further comprising auxiliary lens means in the path of said auxiliary sub-beam for forming an image of the radiation source in the focal plane of said objective system means.

3. Apparatus as claimed in claim 2, wherein the radiation-sensitive elements comprise photodiodes having radiation-insensitive margins, the widths of said radiation-insensitive margins closest to the said predetermined location being appreciably smaller than the widths of the remaining radiation-insensitive margins of said photodiodes.

4. Apparatus as claimed in claim 3, wherein a small portion of the radiation-sensitive area of each photodiode in a location of said photodiode that is close to the said predetermined location, is separated from the remainder of the radiation-sensitive area by a portion of the radiation-insensitive surface area, whereby when the intensities of the radiation incident on the separate part of the photodiodes are equal the electric output signal from the smaller part appreciably exceeds that from the greater part.

5. Apparatus as claimed in claim 4, wherein the separated part extends over only a portion of the width of the radiation-sensitive surface and is symmetrical with respect to the center of this surface.

6. Apparatus as claimed in claim 4, wherein the radiation sensitivity of the smaller part appreciably exceeds that of the greater part.

* * * * *